Jan. 24, 1961

D. B. COLEMAN 2,968,923

MOBILE STARTER FOR JET AIRCRAFT ENGINES

Filed May 6, 1955

*INVENTOR.*
DANIEL B. COLEMAN

BY

*William R. Lam*

ATTORNEY

Jan. 24, 1961
D. B. COLEMAN
2,968,923
MOBILE STARTER FOR JET AIRCRAFT ENGINES
Filed May 6, 1955
5 Sheets-Sheet 2
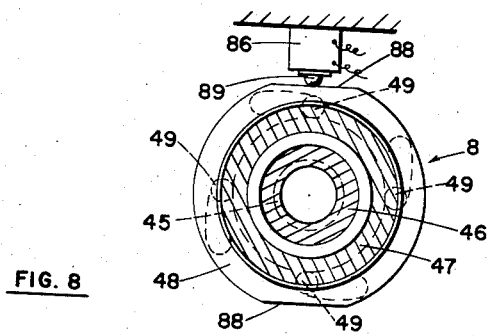
FIG. 8
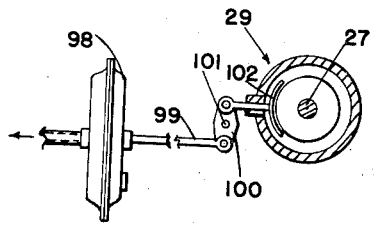
FIG. 9
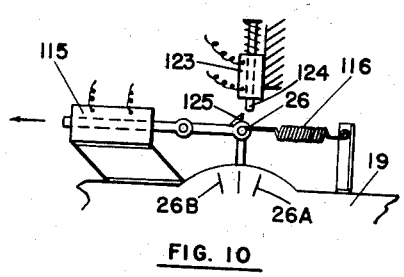
FIG. 10
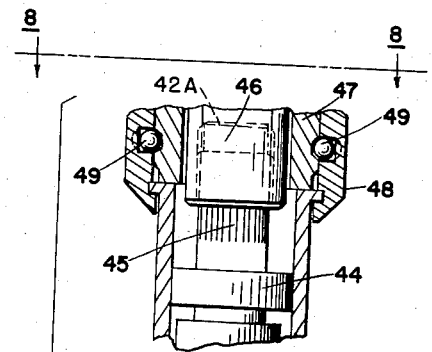
FIG. 6
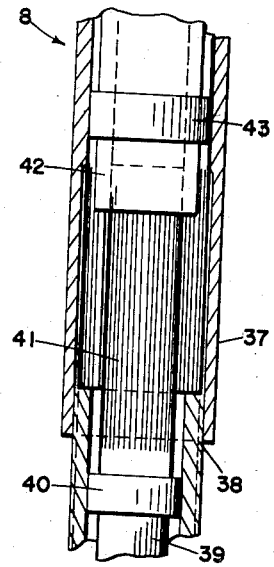
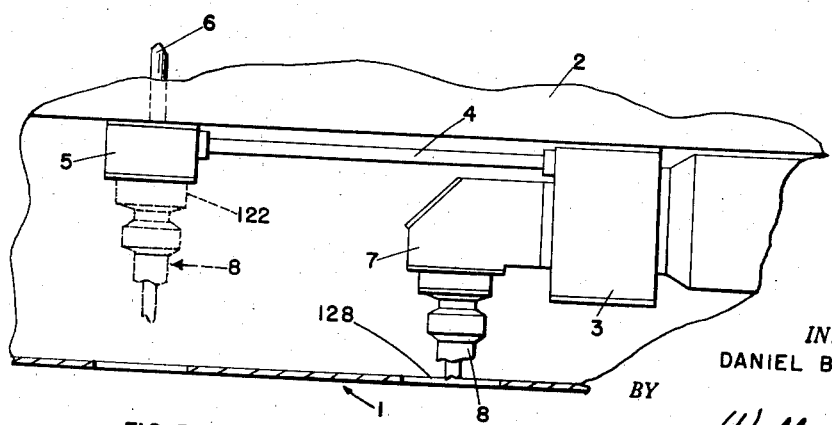
FIG. 3
INVENTOR.
DANIEL B. COLEMAN
BY William R. Lane
ATTORNEY Jan. 24, 1961 D. B. COLEMAN 2,968,923
MOBILE STARTER FOR JET AIRCRAFT ENGINES
Filed May 6, 1955 5 Sheets-Sheet 3
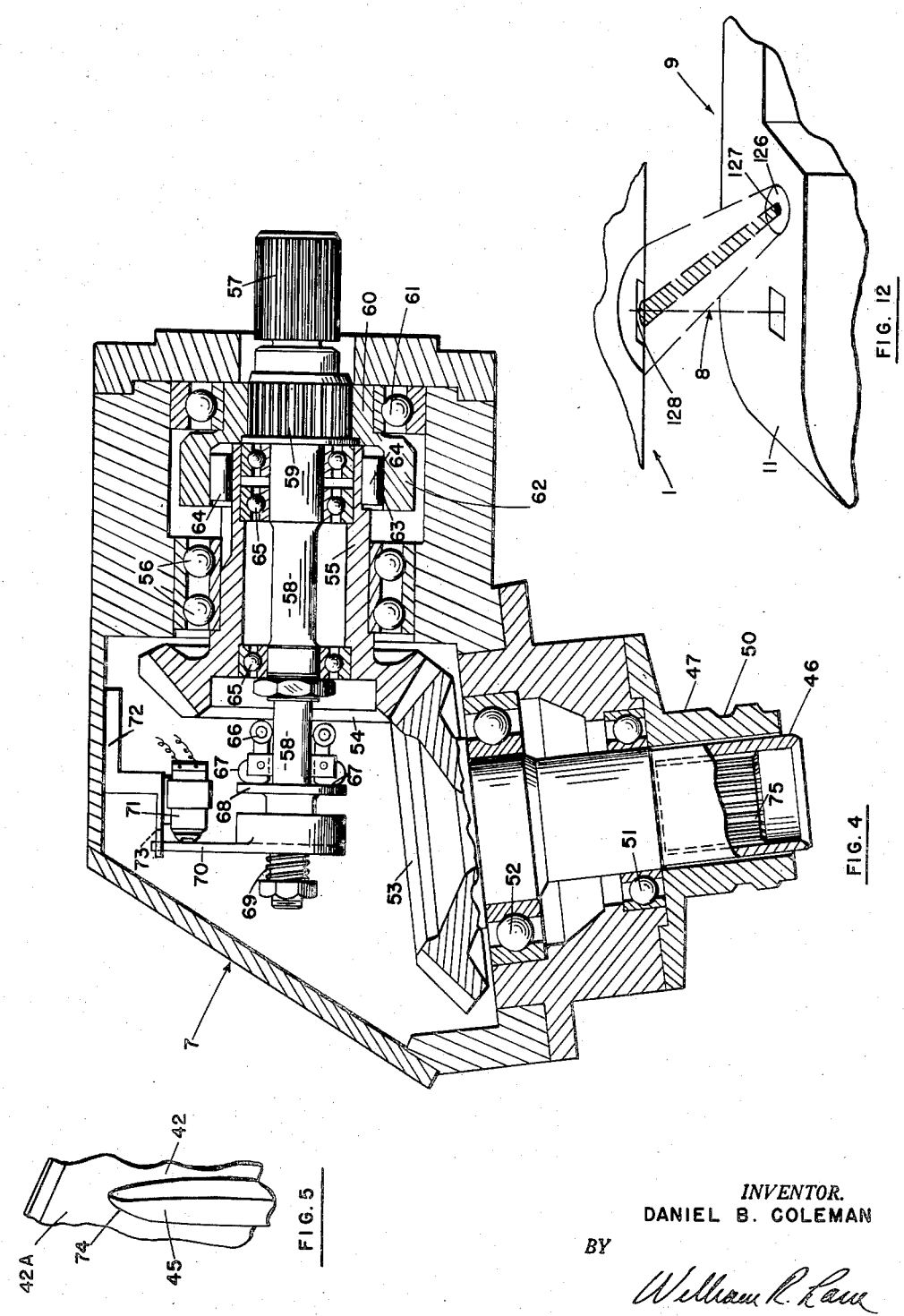
INVENTOR.
DANIEL B. COLEMAN
BY
*William R. Lane*
ATTORNEY

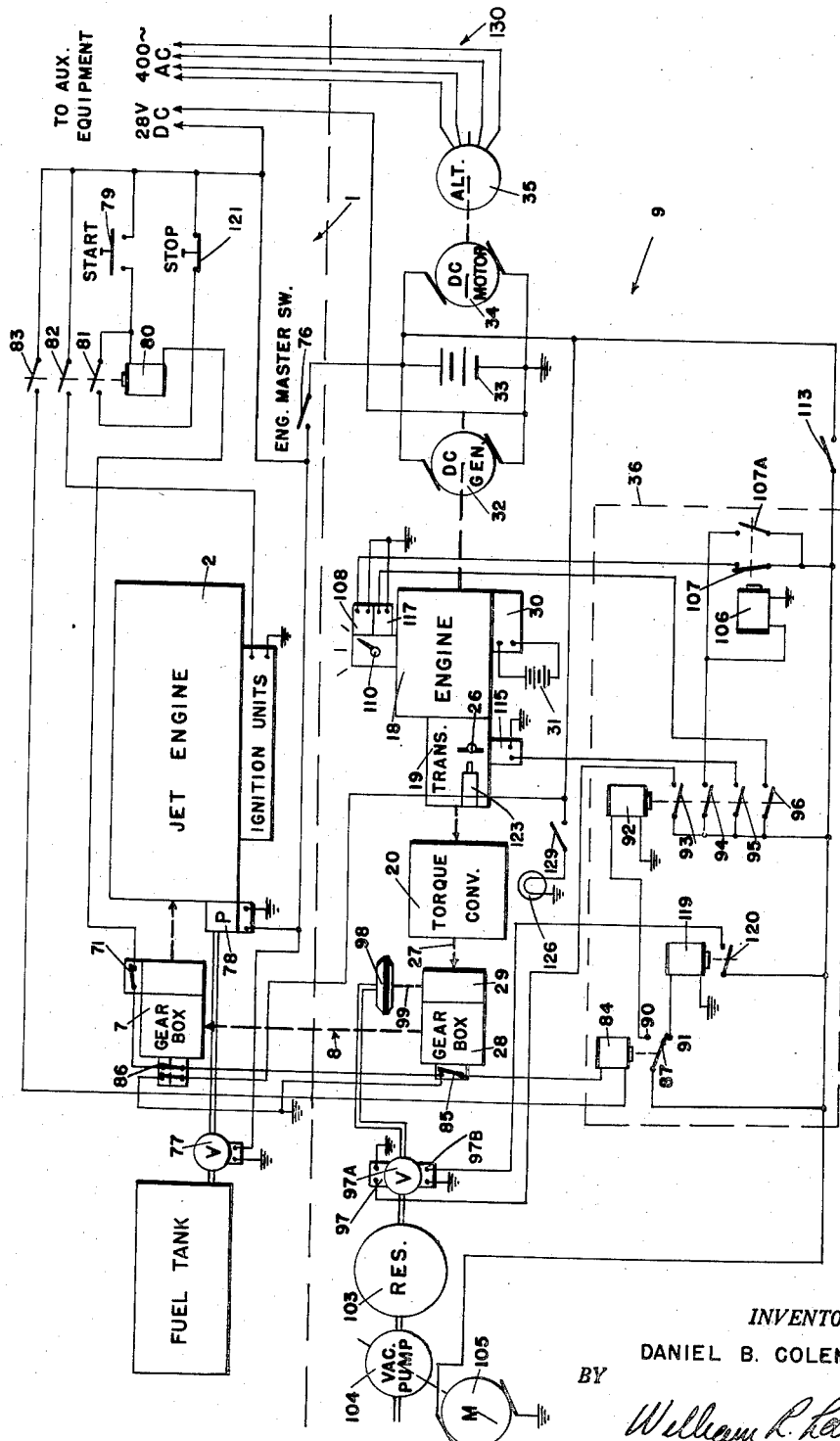

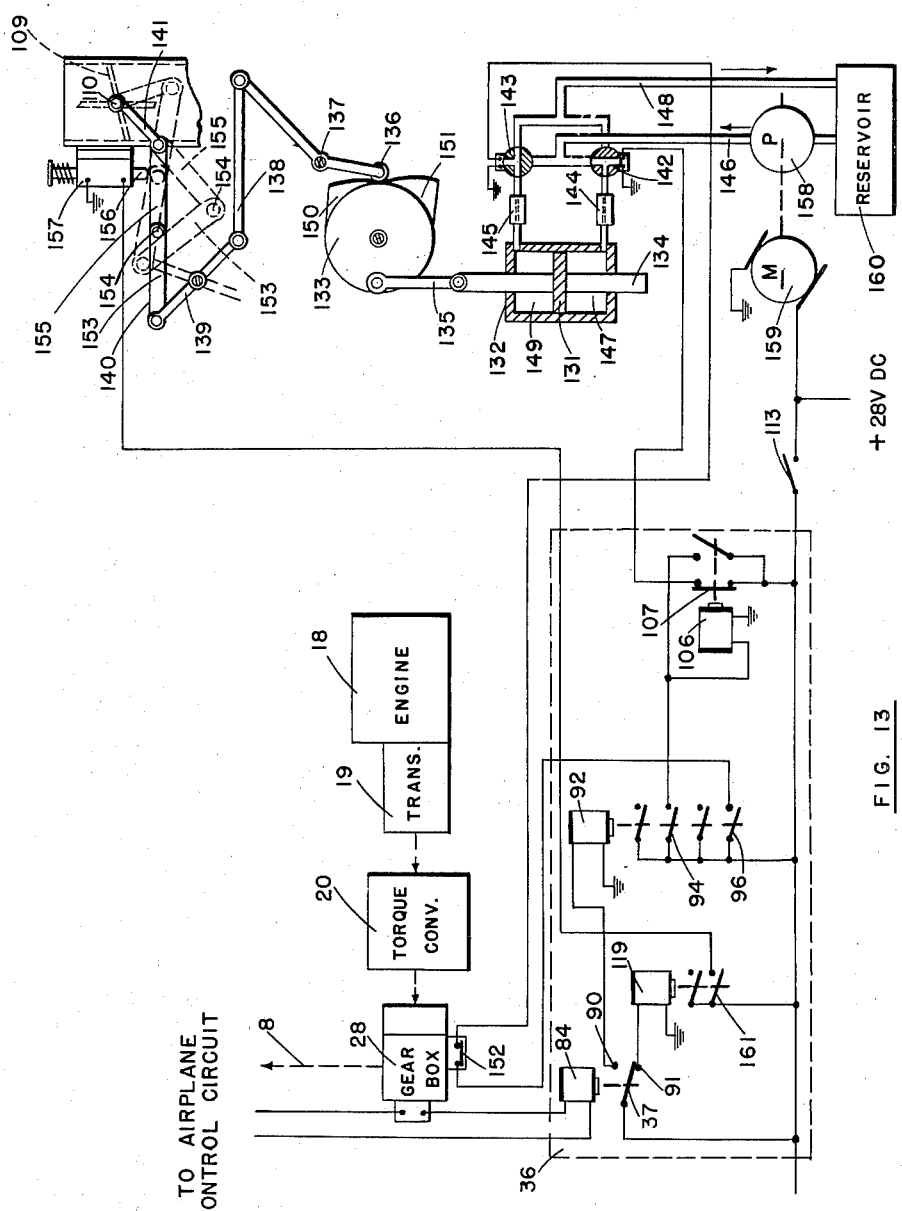

United States Patent Office 2,968,923
Patented Jan. 24, 1961

2,968,923

MOBILE STARTER FOR JET AIRCRAFT ENGINES

Daniel B. Coleman, Los Angeles, Calif., assignor to North American Aviation, Inc.

Filed May 6, 1955, Ser. No. 506,578

4 Claims. (Cl. 60—39.14)

This invention pertains to a mechanical starter for jet engines. More particularly, the starter is adapted for use in jet engines installed in aircraft.

In the past, mechanical starters for piston type airplane engines have been known. These do not represent any unusual problems since there is primarily involved the cranking of an internal combustion engine. However, in respect of jet engines it has been found that the rate of acceleration of the starting unit must be closely controlled. The applied torque must be sufficient to overcome the polar inertia of the engine to obtain a rapid controlled acceleration. At the same time the engine compressors must not stall, for instance, because of improper speed control of the inlet compressors.

In the operation of jet engines it is necessary to provide air from the inlet compressors at a pre-selected rate at any given operating condition thereof depending upon the characteristics of the engine. If excessive or uncontrolled starting accelerations are provided the engine may not start, a stall may occur, or structural parts of the engine may be damaged. In other words, if the engine is not accelerated within controlled limits while being started, it will either be damaged, will not start, or be started under conditions that will result in damage to the engine. Thus, if the rotors in the inlet compressors are operated too rapidly, there will be insufficient airflow because the rotors will be, in effect, operating in a vacuum. If the engine does start under such conditions it will have what is known as a "hot start" with resultant damage to the engine.

Engine starting torque must therefore be applied in stepless, shockless increments. Starting must be accomplished by the pilot from the aircraft, and the arrangement must be such that the starter will become automatically disengaged when starting has been accomplished. The starter unit must also be capable of, in effect, operating the jet engine and all operating parts thereof, such as controls and accessories, while the engine is being started.

An arrangement is necessary to operatively disconnect the accessories and auxiliary equipment of the jet aircraft from the mechanical starter upon reaching predetermined operating speed wherein the normal equipment of the airplane takes over and controls the operation of the jet engine.

Generally speaking, the invention comprises a land vehicle which is low to the ground to get under jet airplanes. The driver's seat is to one side of the vehicle. Four-wheel drives are used, and front and back steering are provided to obtain a minimum radius of turning. An internal combustion type power plant of pre-selected capacity is used together with a torque converter for conveying power from the engine of the land vehicle to the jet engine. Other power means may be employed, for instance, an electric motor and an electric clutch or a gas turbine engine and torque converter having predetermined acceleration characteristics.

The arrangement contemplates that the starter unit be driven under a jet aircraft that is parked, for instance, at the end of a runway and then be operatively connected to the jet engine. When the pilot is ordered to take off, whether to intercept enemy aircraft or on a commercial jet transport flight, he operates the starting controls, and the mechanical starter accelerates the jet engine to starting condition. In a matter of a few seconds (15–18) the jet engine is brought up to operating speed whereupon the mechanical starter becomes operatively disconnected and the ordinary operating controls of the aircraft take over. The starter is then disconnected from the engine and the vehicle removed from the airplane. In a few more seconds (7–10) the aircraft may be starting down the runway for takeoff. This effects a great saving in time and fuel and keeps jet engine noises to a minimum.

By having the starter low to the ground it may pass underneath jet aircraft from side to side and successively start a large number of aircraft so that takeoffs may be made with a minimum loss of time.

Referring now more particularly to the drawings:

Fig. 3 is an elevational view showing the connection to a jet engine;

Fig. 4 is a sectional view of the gear box shown in Fig. 3;

Fig. 5 is a detail of a spline connection;

Fig. 6 is a sectional view of the drive shaft;

Fig. 7 is a schematic view of applicant's invention;

Fig. 8 is a view along line 8—8 of Fig. 6;

Fig. 9 is a detail of the vacuum brake shown in Fig. 7;

Fig. 10 is a detail of the transmission shift;

Fig. 12 is a view of a locating arrangement; and

Fig. 13 is a detail of a modified throttle control.

Figure 1:
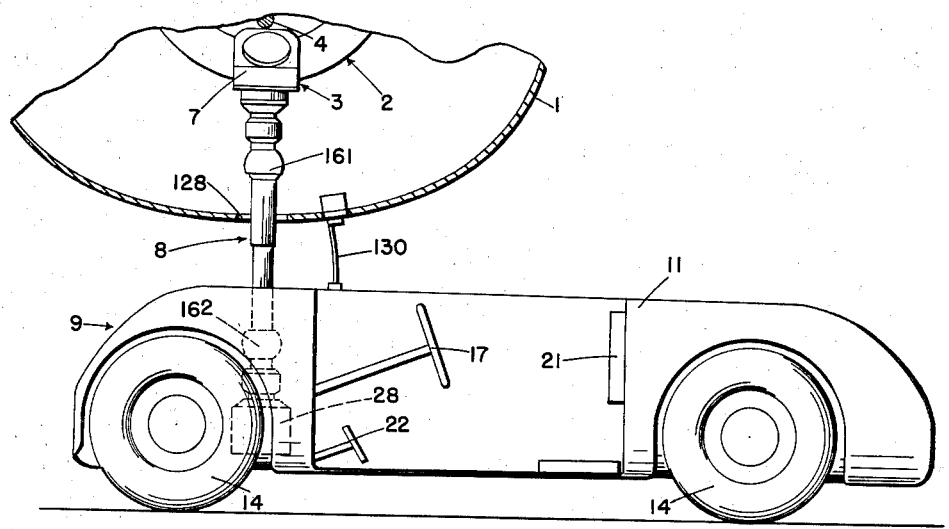
Fig. 1 shows an arrangement of the invention in operative relation with a jet engine in an airplane.

Referring now to the drawings, an airplane fuselage 1 houses a jet engine referred to generally as 2. Attached to the airplane in any suitable manner is an accessory drive gear box referred to generally as 3. As shown in Fig. 3 this gear box is operatively connected to the jet engine in a known manner by means of a shaft 4 connected to a right angle gear box 5 and a shaft 6 operatively connected with the main engine rotor shaft in a manner well known in the art. Applicant's invention is adapted to start the engine by driving shaft 4 through an airborne gear box 7 connected by a shaft referred to generally as 8 to a ground starter unit referred to generally as 9.

Figure 2:
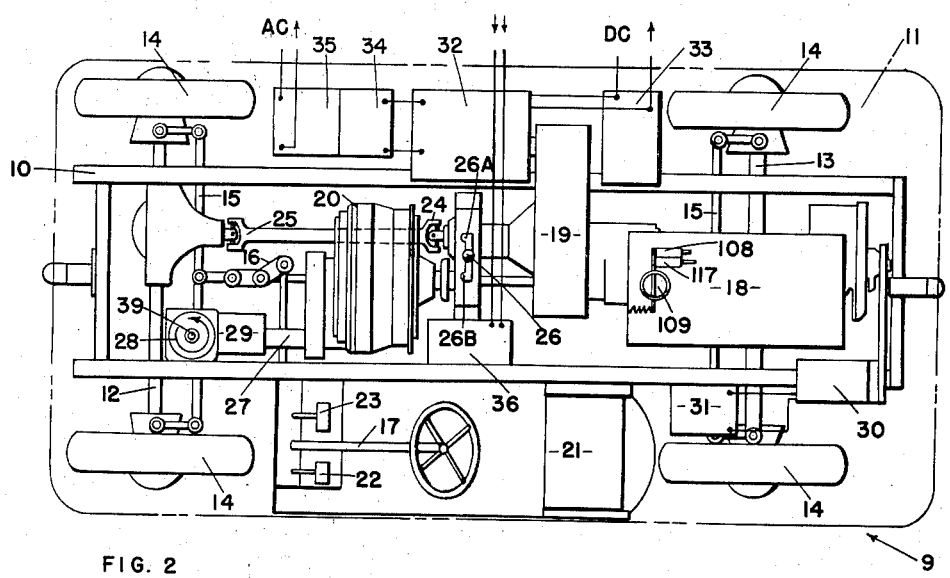
Fig. 2 is a top plan view of the invention.

The ground starter unit comprises a land vehicle with a chassis 10 supporting a body 11. Suitably connected to the chassis are axles 12 and 13 supporting wheels 14 provided with a suitable steering arrangement 15, 16 and 17. The chassis supports an engine 18 which is preferably of the internal combustion type. The engine is operatively connected to the transmission 19 which in turn is operatively connected to a torque converter 20 in a well known manner. The vehicle is provided with a seat 21 for the driver and with clutch and brake pedals 22 and 23 along the lines of an ordinary automobile. The vehicle may be driven by the engine through the transmission and a universal joint 24 and driving shaft 25 operatively connected to axle 12. A similar arrangement, not shown, operatively drives rear axle 13. A gear shift 26 operatively connects transmission 19 with drive shaft 25 in one position of operation. As shown in Fig. 2 the gear shift lever 26 is in neutral position. Movement to the right to position 26A connects the transmission with the drive shafts for the front and rear wheels. Movement of the gear shift lever to the left to position 26B as shown in Fig. 10 connects the transmission with the torque converter 20 in a manner well known in the automotive art. Operatively connected to torque converter 20 (Fig. 2) is a shaft 27 which in turn is connected through power take off gear box 28 to shaft 8. Shaft 27 is provided with a brake 29 to be hereinafter more fully described. The vehicle is provided with a generator 30 and a battery 31 for lights, ignition and to start engine 18. Operatively connected to transmission 19 is a D.C. generator 32 connected in parallel with the battery 33. Operatively connected with the generator 32 is a motor 34 driving an alternator 35 to produce alternating current for certain accessories of the airplane during the starting operation. Generator 32 and battery 33 are also operatively connected to the airplane by cable 130 for supplying direct current to certain portions of the operating mechanism thereof during starting of the airplane. A control box 36 contains relays, switches and the like operatively connected to various operating mechanisms of applicant's invention in a manner to be hereinafter more fully described.

Referring now to Fig. 6 of the drawings there is shown drive shaft 8 comprising an outer stationary housing 37 having a telescopic connection at 38 and housing a drive shaft 39 operatively connected to power take off gear box 28 by suitable splines not shown. Drive shaft 39 is supported by suitable bearings 40. The drive shaft is provided with a splined portion 41 adapted to operatively engage corresponding splines internally provided on shaft 42 which in turn is rotatably supported in housing 37 by bearings 43 and 44. The upper portion of shaft 42 is splined at 45 to fit into a correspondingly internally splined sleeve 46 supported in collar 47 integral with gear box 7. Housing 37 is locked to collar 47 by means of a rotatable collar 48 and balls 49 which engage recess 50 in a manner well known in the art. Shaft 39 is connected to gear box 28 in a manner similar to the spline connection 45, 46, collar 47, and locking arrangement 48, 49 and 50.

Referring now to Fig. 4 sleeve 46 is supported by suitable bearings 51 and 52. Integral wtih this sleeve is a spiral beveled gear 53 meshing with spiral beveled gear 54 which in turn is integral with a sleeve 55 supported in housing 7 by bearings 56. Sleeve 55 is operatively connected to the splined extension 57 of shaft 58, rotatably supported in sleeve 55 by bearings 65, by means of a suitable clutch comprising splines 59 on shaft 58 connecting with a correspondingly splined collar 60 supported in housing 7 by bearings 61 and provided with a skirt 62 which is provided with inclined surfaces at 63 in a well known manner to provide with rollers 64 a free wheeling clutch with sleeve 55. This free wheeling clutch operates to apply torque to shaft 58 when driven in one direction and when the speed of the driven member exceeds the speed of sleeve 46, the clutch is adapted to free wheel and, in effect, be disconnected. Splined extension 57 engages suitable gear means in accessory drive gear box 3 to drive shaft 4 for applying torque to the aircraft jet engine through gear box 5 and shaft 6.

Shaft 58 is provided with a fly ball governor 66 pivotally connected thereto and provided with cam surfaces 67 adapted to press against collar 68 slidably mounted on shaft 58 and held in position by spring 69. Integral with collar 68 is an arm 70 adapted to engage an electric switch 71 suitably supported in gear box 7 by a bracket 72. Arm 70 is slidably received in cutout 73 of bracket 72 to prevent rotation of the arm 70.

Referring now to Fig. 5 there is shown a portion of shaft 42 provided with a pilot section 42A and having splines 45 tapered at 74 for ready engagement with the internal splines 75 of sleeve 46.

In the schematic arrangement shown in Fig. 7 the jet engine 2 is adapted to be started by the pilot from a cockpit position. For that purpose there is provided an engine master switch 76 for supplying power for conditioning certain of the electrical equipment in the airplane. This equipment includes such items as the main fuel system shut off valve 77, fuel transfer pump 78 and other accessory equipment such as engine fuel regulator, throttle relay, booster pumps, electronic devices, navigation devices, radar, radio, etc. Power is supplied to starter switch 79 which in turn operates a relay 80 for closing spring loaded contacts 81, 82 and 83. Contact 81 is a hold contact for relay 80, contact 82 supplies electrical energy to the ignition units of jet engine 2 and contact 83 energizes the main control relay 84 located in the control box 36 of the ground starter unit. In series with switch 83 and relay 84 are a trio of switches 85, 86 and 71.

Figure 11:
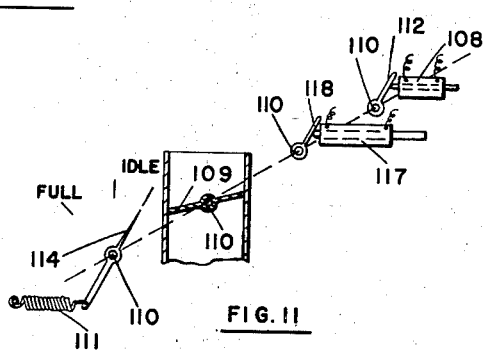
Fig. 11 is a detail of a throttle control.

Switch 85 is a safety switch located on gear box 28 and is adapted to be closed when the shaft 39 is properly engaged in gear box 28. Similarly, switch 86 is closed when shaft 42 is properly engaged in collar 46 (see Fig. 8). Thus collar 48 has a flat portion 88 for engagement by contact 89 when shaft 42 is properly engaged with 46 and collar 48 properly locked with sleeve 47. Referring again to Fig. 7, relay 84 is adapted to operate double contact switch 87 adapted to engage a contact 90 or a contact 91. When switch 87 engages contact 90 it energizes a relay 92 which in turn closes switches 93, 94, 95 and 96. Switch 93 is connected with actuating solenoid 97 af valve 97A and operates the valve to close off the vacuum to vacuum boost 98 for releasing the brake 23 on shaft 27. As shown in Fig. 9 shaft 99 is operated by vacuum boost 98 to move lever 100 pivoted at 101 to apply or relieve force on brake shoe 102. Vacuum boost 98 is operatively connected in a well known manner to reservoir 103 and pump 104 driven by motor 105. Switch 94 is operatively connected to relay 106 and opens contact 107 to de-energize solenoid 108 (see Fig. 11) to release throttle 109 from its intermediate position to an idling position. At the same time switch 107A is closed to hold relay 106 in energized position. Throttle 109 is mounted on shaft 110 to which is connected a spring 111 for urging the same into idling position. Solenoid 108 engages lever 112 upon actuation of switch 113 to move the throttle to intermediate position. Indicator 114 also attached to shaft 110 shows the position of the throttle. Switch 95 energizes solenoid 115 for moving transmission shifting mechanism 26 to operatively connect engine 18 with torque converter 20. Solenoid 115 moves member 26 against the action of return spring 116. Switch 96 which is provided with a time delay provision then operates solenoid 117 to move lever 118 to shift throttle 109 to full throttle position. Engine 18 thereupon operates at full power condition transmitting torque through torque converter 20 to shaft arrangement 8 and through gear box 7 to rotate jet engine 2. The jet engine is rotated with uniform acceleration to a starting condition in a matter of a few seconds. When started, and upon reaching a predetermined rotative speed which, in the preferred embodiment of the invention is 3500 r.p.m., the over-running clutch referred to in Fig. 4 permits the engine to operate at any desired speed above the predetermined speed of the overrunning clutch. Thereupon, fly ball governor 66 causes contacts in switch 71 to open which disconnects the circuit to relay 80 and de-energizes the same and opens contacts 81, 82 and 83. This results in de-energizing relay 84 allowing switch 87 to engage contact 91 energizing relay 119 to close switch 120 and energize solenoid 97B to open valve 97 to apply brake 29 to shaft 27. Upon switch 87 becoming disengaged from contact 90, relay 92 is de-energized and contacts 93, 94, 95 and 96 are opened to de-energize solenoid 117 to permit the throttle to return to idling position. Likewise solenoid 115 is de-energized permitting gear shift lever 26 to return to neutral position.

Referring to Fig. 7 a stop switch 121 is provided to de-energize relay 80 in the event a start is not effected and it is desired to disconnect the units energized by solenoid 80 and recondition the arrangement for a new start.

Referring to Fig. 3 there is provided a gear box 122 for connection of member 8 in the event it is desired to bypass the accessory gear box 3.

Referring now to Fig. 10 there is provided a solenoid arrangement 123 adapted to be actuated by one of the contacts in switch 86, Fig. 7. Switch 86 is closed when shaft 8 is properly connected to the gear box in which instance solenoid 123 causes stop member 124 to be moved downwardly in the path of lug 125 to prevent shifting of the gear shift lever 26 to its drive position 26A. This prevents the starter unit from being driven away while shaft 8 is operatively connected to the airplane.

To assist in locating the starter unit under the airplane in a position for engagement of shaft 8 with gear box 7 there is provided, as shown in Fig. 12, a locating light 126 having a locating spot 127 thereon. The light comprises an ordinary spotlight mounted on an adjustable bracket in a manner well known in the art. The locating spot may be so co-ordinated with respect to any particular type of aircraft that when the spot centers on the opening 128 the vehicle may be stopped and shaft 8 operatively connected with gear box 7. Light 126 is controlled by switch 129 as shown in Fig. 7. Universal joints 161—162 in shaft assembly 8 accommodate minor misalignments of gear boxes 7 and 28.

Referring to Fig. 13 a modified throttle control is shown. Fluid under pressure is applied to double acting piston 131 in cylinder 132 to rotate cam 133 operatively connected to piston rod 134 through pitman 135. Fluid pressure may be bled from torque converter 20 in a manner well known in the art or supplied from reservoir 160 by a suitable auxiliary pump 158 driven by motor 159. Cam follower 136 pivoted at 137 moves throttle 109 through links 138, 139 and 140 attached to arm 141 mounted on shaft 110. Throttle movement is controlled by solenoid actuated valves 142—143 and rate of response is controlled by flow restrictors 144—145 in the fluid lines to cylinder 132.

Initially engine 18 may require operation at an intermediate speed to provide suitable electric power output to cable 130. To advance the throttle from idle position to intermediate speed switch 113 is closed energizing solenoid valve 142 to direct fluid pressure from line 146 through restrictor 144 to chamber 147 of cylinder 132. Solenoid valve 143 is de-energized and open to line 148 for return flow of fluid from chamber 149. Piston 131 advances, rotating cam 133 clockwise and lobe 150 displaces cam follower 136 moving links 138-139-140-141 to open throttle 109 to intermediate speed position.

Upon initiation of the starting cycle by the pilot the throttle is returned to idle as solenoid valve 142 is deenergized by relay switch 94 opening contact 107. Solenoid valve 142 when de-energized is open to return line 148 for fluid flow from chamber 147. Relay switch 96 energizes solenoid valve 143 to direct fluid pressure to chamber 149 to return piston 131 to mid-position and throttle 109 is urged to idle position by spring 111. Piston 131 continues its travel as fluid is admitted to chamber 149 and now rotates cam 133 counterclockwise. Restrictors 144—145 reduce the rate of fluid flow to control the timing of the throttle movement, preventing a too rapid advance to full power condition. Lobe 151 displaces cam follower 136 to move throttle 109 to full power position. A centrifugal switch 152 in gear box 28, similar in construction to switch 71 (in gear box 7), de-energizes solenoid valve 143 upon reaching a predetermined r.p.m. This prevents further throttle advance and avoids overspeeding engine 18.

When the jet engine 2 reaches a predetermined rotative speed and switch 152 opens, throttle 109 is returned to idle position. However, restrictors 144—145 which control the rate of advance of the throttle also limit the return rate. To promptly retard engine 18 to idling speed, member 140 is arranged as a break link. Section 153 attached to link 139 is pivotally connected at 154 to section 155 attached to throttle arm 141. Pivot 154 lies over center and member 140 functions normally as a fixed link. In the full throttle position pivot 154 is moved into line with plunger 156 of solenoid 157. When relay 119 is energized switch 161 closes to energize solenoid 157 causing plunger 156 to collapse link 140 as indicated. This allows spring 111 to close throttle 109. Piston 131 and cam 133 meanwhile return to idle position allowing the linkage 138-139-140 to return to the original configuration. With the throttle linkage in idle position plunger 156 no longer bears upon pivot 154 and is incapable of collapsing link 140.

The foregoing detailed description is to be understood as given by way of example only, the spirit and scope of this invention being limited only by the appended claims.

I claim:

1. A starting device for a turbojet engine comprising a land vehicle; power means carried by said vehicle; a torque converter means connecting said power means to said turbojet engine for applying torque thereto, said torque converter means including gear shift means for disconnecting said turbojet engine from said power means; and means controlled by the pilot of said aircraft operatively connected from the cockpit of the aircraft to the starting device for initiating the sequential starting cycle of said engine, said control means including means for automatically reducing the speed of said power means to a predetermined value upon initiation of the starting cycle, means automatically engaging said power means with said jet engine, and means for automatically increasing the speed of said power means until a predetermined speed of said jet engine is reached; and means automatically operating said gear shift means to disconnect said power means from said turbojet engine when the jet engine reaches the predetermined speed.

2. A starting device for a turbo jet engine having electrically-operated accessory devices comprising a power means; means connecting said power means to the turbojet engine to impart a gradually increasing starting torque thereto, said means including means for disconnecting said turbojet engine from said power means; means operable by said power means for operating said accessory devices preliminary to applying starting torque to said engine; means for automatically reducing the speed of said power means to idling speed; means for operatively engaging said power means with said turbojet engine; and means for increasing the speed of said power means to a predetermined amount; and means for automatically operating said disconnect means to disconnect said power means from said turbojet engine when the turbojet engine attains a predetermined starting speed.

3. A starting device for turbojet engines having electrically-operated accessories comprising a power means; a torque converter means connecting said power means to said jet engine, said torque converter means including gear shift means for disconnecting said turbojet engine from said power means; a generator operated by said power means for supplying electrical energy to the accessories prior to applying starting torque to said engine; means for sequentially reducing said power means to idling speed; means for sequentially operatively engaging said power means with said torque converter means; and means for sequentially increasing the speed of said power means to a predetermined amount following engagement of said power means with said torque converter means; and means for automatically operating said gear shift means to disconnect said power means from said turbojet engine when a predetermined starting speed of the turbojet engine is attained.

4. A starting device for turbojet engines having electrically-operated accessories comprising a power means;

means connecting said power means to said jet engine for imparting a gradually increasing starting torque thereto, said connecting means including means for disconnecting said turbojet engine from said power means; means operated by said power means for operating said accessories; means for connecting said power means to said accessory operating means to operate the same preliminary to and during the application of starting torque to said engine; means for reducing the speed of said power means; means for engaging said power means with said jet engine while at said reduced speed; and means for increasing the speed of said power means after engagement of said power means with said turbojet engine; and means automatically operating said disconnect means to disconnect said power means from said turbojet engine when the engine reaches a predetermined speed.

References Cited in the file of this patent

UNITED STATES PATENTS

| | | |
|---|---|---|
| 1,313,693 | Hucks | Aug. 19, 1919 |
| 1,331,791 | Wilkinson | Feb. 24, 1920 |
| 2,652,685 | Willgoos | Sept. 22, 1953 |
| 2,680,377 | Gerst | June 8, 1954 |
| 2,751,749 | Newcomb | June 26, 1956 |

FOREIGN PATENTS

| | | |
|---|---|---|
| 578,770 | Great Britain | July 11, 1946 |
| 670,309 | Great Britain | Apr. 16, 1952 |